US012742490B2

(12) United States Patent
Forté et al.

(10) Patent No.: US 12,742,490 B2
(45) Date of Patent: Sep. 22, 2026

(54) LINEAR ACTUATOR WITH RADIAL SUPPORT MEMBER

(71) Applicant: GESTION LAFOREST INC., St-Hubert (CA)

(72) Inventors: Alain Forté, Boucherville (CA); Alain Gobeil, Montréal (CA); Pierre Laforest, Brossard (CA)

(73) Assignee: GESTION LAFOREST INC., St-Hubert (CA)

( * ) Notice: Subject to any disclaimer, the term of this patent is extended or adjusted under 35 U.S.C. 154(b) by 0 days.

(21) Appl. No.: 19/097,470

(22) Filed: Apr. 1, 2025

(65) Prior Publication Data

US 2025/0230858 A1 Jul. 17, 2025

Related U.S. Application Data

(63) Continuation of application No. 18/258,936, filed as application No. PCT/CA2022/050030 on Jan. 11, 2022, now Pat. No. 12,287,026.

(Continued)

(51) Int. Cl.
*F16H 25/12* (2006.01)
*F16H 55/02* (2006.01)

(52) U.S. Cl.
CPC ............ *F16H 25/12* (2013.01); *F16H 55/02* (2013.01)

(58) Field of Classification Search
CPC .. B25J 18/02; F16H 19/0618; F16H 19/0645; F16H 25/12
See application file for complete search history.

(56) References Cited

U.S. PATENT DOCUMENTS 4,875,660 A * 10/1989 Gagnon .................... B66F 7/10 254/89 R
7,213,796 B2 5/2007 LaForest
(Continued)

FOREIGN PATENT DOCUMENTS

JP 2007192257 A 8/2007
WO 2019112886 A1 6/2019

OTHER PUBLICATIONS

Written Opinion of the International Searching Authority dated Feb. 10, 2022.

*Primary Examiner* — Jake Cook
(74) *Attorney, Agent, or Firm* — Jacob M. Ward; Ward Law Office LLC

(57) ABSTRACT

The linear actuator comprises elongated first and second bands that cooperate to form an extractable and retractable column. Rotatable first and second band guide members respectively guide turns of the first and second bands into intertwined engagement. A power actuator causes rotation of the first and second band guide members such that the extractable and retractable column may be extracted or retracted. A base carries the power actuator, the first and second bands and the first and second band guide members. An anti-rotation mechanism comprises a first anti-rotation member attached to the base and a complementary second anti-rotation member attached to at least one of the first and second bands, with the first and second anti-rotation members engaging one another in the column to prevent rotation of the column relative to the base. The engagement of the first and second anti-rotation members is non-punctual about a periphery of the column.

17 Claims, 8 Drawing Sheets

Related U.S. Application Data

(60) Provisional application No. 63/136,310, filed on Jan. 12, 2021.

(56) References Cited

U.S. PATENT DOCUMENTS

| | | | |
|---|---|---|---|
| 10,050,342 | B1 | 8/2018 | Hall et al. |
| 10,183,404 | B2 | 1/2019 | Yim |
| 10,898,652 | B2 | 1/2021 | Judson et al. |
| 11,371,593 | B2 | 6/2022 | Iwamoto et al. |
| 2021/0214203 | A1 | 7/2021 | Erickson |

* cited by examiner

LINEAR ACTUATOR WITH RADIAL SUPPORT MEMBER

CROSS-REFERENCE TO RELATED APPLICATIONS

The present application is a Continuation of U.S. utility patent application Ser. No. 18/258,936 filed on Jan. 11, 2022, that claims conventional priority of U.S. provisional patent application No. 63/136,310 filed on Jan. 12, 2021.

FIELD OF THE INVENTION

The invention relates to linear actuators of the type that use intertwined bands to form an extractable column, and more particularly, to an anti-rotation mechanism for such linear actuators.

BACKGROUND OF THE INVENTION

Machines to displace loads include linear actuators that use a flat band that is formed into a helix to form a vertically extractable and retractable column, at one end of which the load is engaged. This kind of device is mainly, although not exclusively, used for lifting and lowering loads.

One such linear actuator of known construction comprises a hollow generally cylindrical rotor rotatably carried over a base fixed to the ground. A motor selectively activates the rotor. A first horizontal band is vertically stacked in a helix and rests in a first band magazine, while a second vertical band is horizontally stacked in a spiral in a second band magazine located co-axially around the rotor. The lower end of each band is always located in its respective magazine, while the upper end of each band is fixedly attached to a load-bearing platform that engages under the load to be lifted. When the rotor is rotated, each turn of the vertical band is guided and installed in helical configuration between two vertically successive turns of the horizontal band, to gradually form a vertical extractable column. The load supported by the column is more particularly transferred through each successive vertical and horizontal band turns that rest on each other, and then to the rotor that supports the horizontal band, and finally, through ball bearings, to the base and the ground that ultimately supports the load.

Such a device was improved upon by providing an interlocking mechanism that interlocks the horizontal and vertical bands. More particularly, the first band includes teeth, and the second band includes openings, such that the teeth of the first band can engage into the openings of the second band to interlock the first and second bands. This helps in preventing accidental disengagement of the successive turns of the bands that form the column, and also allows the linear actuator to be used with its axis being non-vertical, e.g. the linear actuator can be horizontally disposed.

In any of these two linear actuator configurations, the rotor rotates about the first and second bands and carries guides to force the successive turns of the first and second bands into interspersed and interlocked relationship to form the vertical column. The guides carried by the rotor of the linear actuator notably comprise a first guide member, such as a helical groove in the rotor, that guides the turns of the first band from the first band magazine into the vertical column; and a second guide member, such as an insertion pad, that slides onto the outer surface of the second band to guide its turns from the second band magazine into the vertical column.

While the rotor rotates, together with the first and second guide members carried by it, the vertical column itself does not rotate. If it did, the first and second bands would not be forced into inter-engagement, the vertical column would not be formed and the load would not be lifted.

To prevent the rotation of the first and second bands that form the vertical column, it is known to fix the load-bearing platform of the linear actuator, to which the upper ends of the first and second bands are fixed, to the load being lifted; and concurrently, preventing the load from rotation. For example, if the load is a theatre stage being lifted with linear actuators, the theatre stage might be guided along vertical rails to allow vertical movement but prevented from rotation.

In summary, prior art linear actuators with intertwined bands require attachment to the load being lifted, and require that the load being lifted participates in preventing the column from rotating.

One prior art linear actuator provides a solution to avoid having to use the load to prevent rotation of the column. This prior art linear actuator has a ring of interspaced anti-rotation rollers mounted to the fixed base of the linear actuator that cooperate with teeth provided on the first band to prevent rotation of the vertical column. The teeth protrude through openings in the second band to interlock successive turns of the second band, but also, the teeth protrude beyond the outer wall surface of the extractable column. As the teeth in the column move up or down when the vertical column is being extracted or retracted, they slide within spaces defined between the anti-rotation rollers. This results in tangential abutment of a tooth against a corresponding roller while still allowing the teeth to freely move vertically. Consequently, even if the load being lifted by the linear actuator is not prevented from rotation, or even if the linear actuator is not fixed to a load at its top end, this anti-rotation device that is intrinsic to the extractable column could prevent rotation of the column allowing deployment of the column as intended.

One problem with such a system is that the ring of anti-rotation rollers is provided in a plane that is perpendicular to the longitudinal axis of the column, and the abutment of the teeth on the anti-rotation rollers is punctual, i.e., a single tooth actually abuts against a single roller at a single peripheral position about the circumference of the column, or very few teeth abut against very few rollers essentially at a single peripheral position about the circumference of the column. As the column forms, the position of this punctual abutment of teeth on rollers will shift around the vertical column as each roller is successively put to contribution. This is not ideal since the abutment resulting form the tangential abutment is not evenly spread peripherally about the column; it is always essentially punctual. The uneven repartition of the abutment about the vertical column results in undesirable tangential and radial mechanical stresses on the column.

SUMMARY OF THE INVENTION

It is therefore an object of the present invention to provide an intrinsic anti-rotation system for a linear actuator that improves upon prior art systems.

Accordingly, the present invention relates to a linear actuator comprising:

an elongated first band;

an elongated substantially flat second band;

said first and second bands having respective stored portions where they are separate from one another, and respective column portions where they engage one another to form an extractable and retractable column, with the second band column portion forming a helix about a longitudinal axis;

a rotatable first band guide member to guide turns of said first band from its said stored portion into its said column portion;

a rotatable second band guide member to guide turns of said second band from its said stored portion into its said column portion;

a power actuator to cause rotation of said first and second band guide members such that said extractable and retractable column may be extracted or retracted;

a base carrying said power actuator, said first and second bands and said first and second band guide members; and an anti-rotation mechanism comprising a first anti-rotation member attached to said base and a complementary second anti-rotation member attached to at least one of said first and second bands, with the first and second anti-rotation members engaging one another at said column portions of said first and second bands to prevent rotation of the extractable and retractable column relative to the base;

wherein the engagement of the first and second anti-rotation members is non-punctual about a periphery of the extractable and retractable column.

In one embodiment, the non-punctual engagement of said first and second anti-rotation members comprises an engagement of said first and second anti-rotation members for at least one full turn around the extractable and retractable column.

In one embodiment, the first and second anti-rotation members comprise first and second abutment members that abut against each other tangentially with respect to said extractable and retractable column.

In one embodiment, said first and second anti-rotation members comprise teeth provided either on said base or on at least one of said first and second bands, and grooves provided on the other of either said base or at least one of said first and second bands, with the grooves being parallel to the longitudinal axis such that the teeth may relatively slide within the slots in a direction parallel to the longitudinal axis when said extractable and retractable column is extracted or retracted, but prevent rotation of the extractable and retractable column about the longitudinal axis through abutment of the teeth against walls of the grooves.

In one embodiment, the teeth are provided on one of said first and second bands, and the grooves are provided on said base.

In one embodiment, the grooves are provided on an anti-rotation ring that is disposed about a portion of the extractable and retractable column.

In one embodiment, said first and second band guide members are carried by a rotor that is operatively coupled to the power actuator to allow rotation of the rotor by the power actuator, said rotor carrying said first and second bands and said first and second band guide members.

The present invention also relates to an anti-rotation ring for use with a linear actuator of the type comprising:

an elongated substantially flat band having a column portion where turns of said band engage one another to form a helix about a longitudinal axis thereby forming an extractable and retractable column destined to extend through said anti-rotation ring, said band further having a stored portion where its turns are separate from one another;

a rotatable band guide member to guide turns of said band from its said stored portion into its said column portion;

interlocking members to interlock the turns of the band in said column portion;

a power actuator to cause rotation of said band guide member such that said extractable and retractable column may be extracted or retracted;

a base carrying said power actuator, said band and said band guide member; and teeth protruding form said extractable and retractable column;

wherein said anti-rotation ring comprises an attachment for fixing said anti-rotation ring to said base, and grooves coaxially provided on the inner surface of said anti-rotation ring for cooperating with the teeth of the linear actuator for allowing the teeth to move in said grooves in a direction parallel to the longitudinal axis, but preventing rotation of said extractable and retractable column relative to the base about the longitudinal axis, and wherein the engagement of the teeth with the grooves is non-punctual about a periphery of the extractable and retractable column.

The present invention further relates to a linear actuator comprising:

an elongated substantially flat band;

said band having a column portion where turns of said band engage one another to form a helix about a longitudinal axis thereby forming an extractable and retractable column, said band further having a stored portion where its turns are separate from one another;

a rotatable band guide member to guide turns of said band from its said stored portion into its said column portion;

interlocking members to interlock the turns of the column portion of the band;

a power actuator to cause rotation of said band guide member such that said extractable and retractable column may be extracted or retracted;

a base carrying said power actuator, said band and said band guide member; and an anti-rotation mechanism comprising a first anti-rotation member attached to said base and a complementary second anti-rotation member attached to said band, with the first and second anti-rotation members engaging one another at said column portion of said band to prevent rotation of the extractable and retractable column relative to the base;

wherein the engagement of the first and second anti-rotation members is non-punctual about a periphery of the extractable and retractable column.

DETAILED DESCRIPTION OF THE EMBODIMENTS

Figure 1:
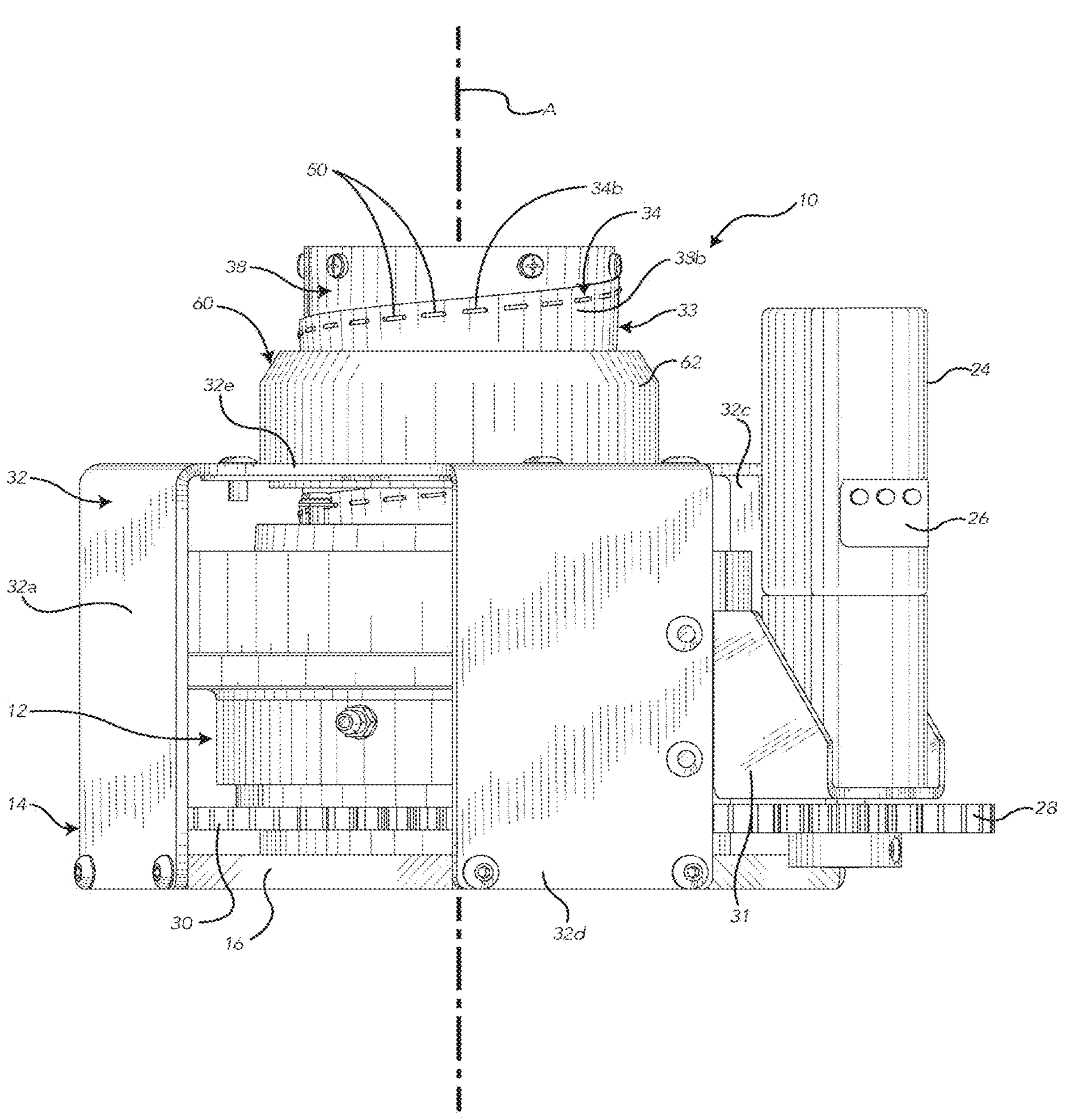
FIG. 1 is a front elevation of a linear a linear actuator equipped with an anti-rotation device according to the present invention.
Figure 2:
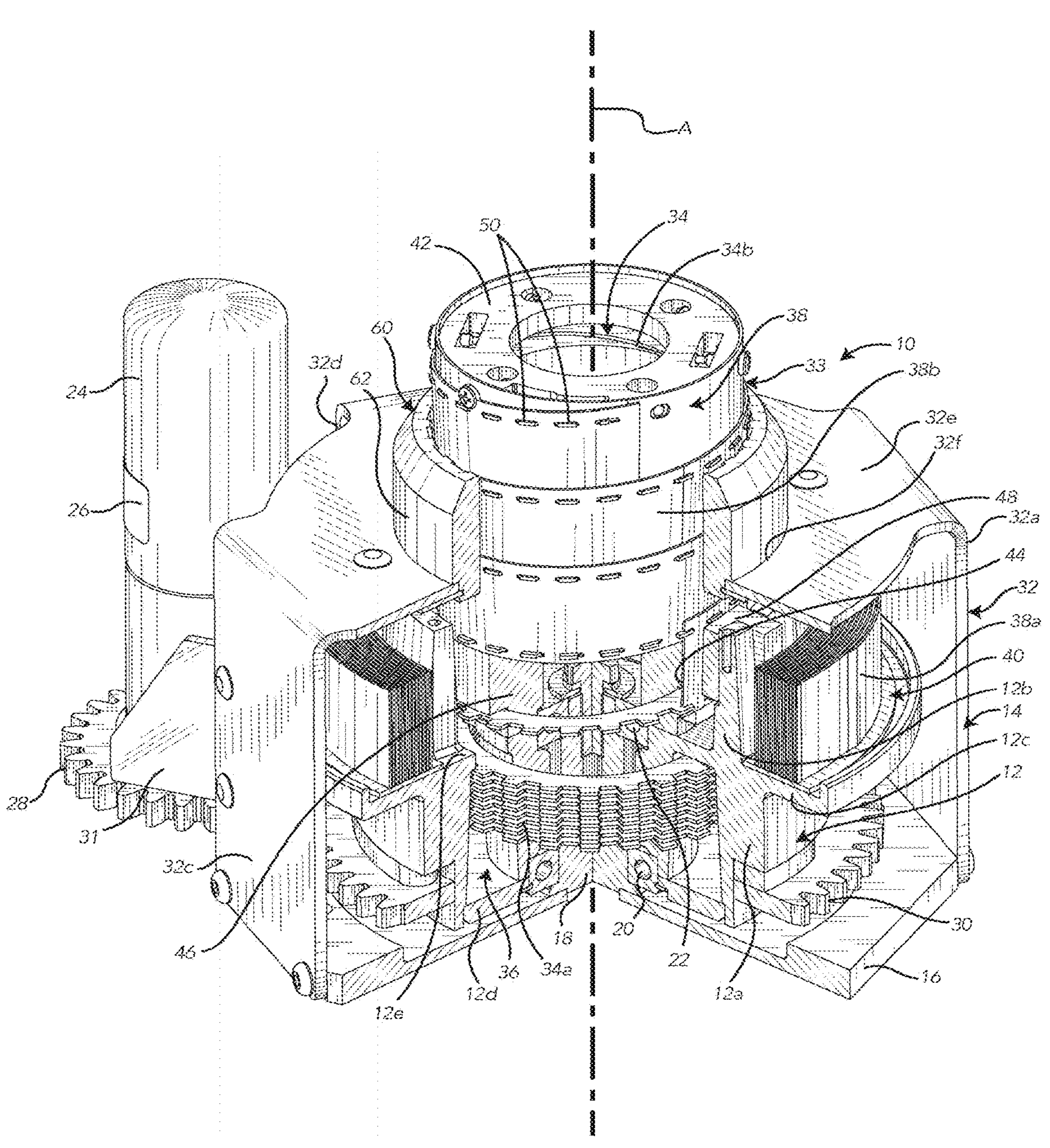
FIGS. 2 and 3 are partly broken perspective views showing the linear actuator of FIG. 1, wherein a portion of the base, rotor, second band and anti-rotation device are broken to show otherwise concealed elements within, with FIG. 2 showing the vertical column in a first position that is mostly retracted and FIG. 3 showing the vertical column being partly extracted relative to FIG. 2.
Figure 3:
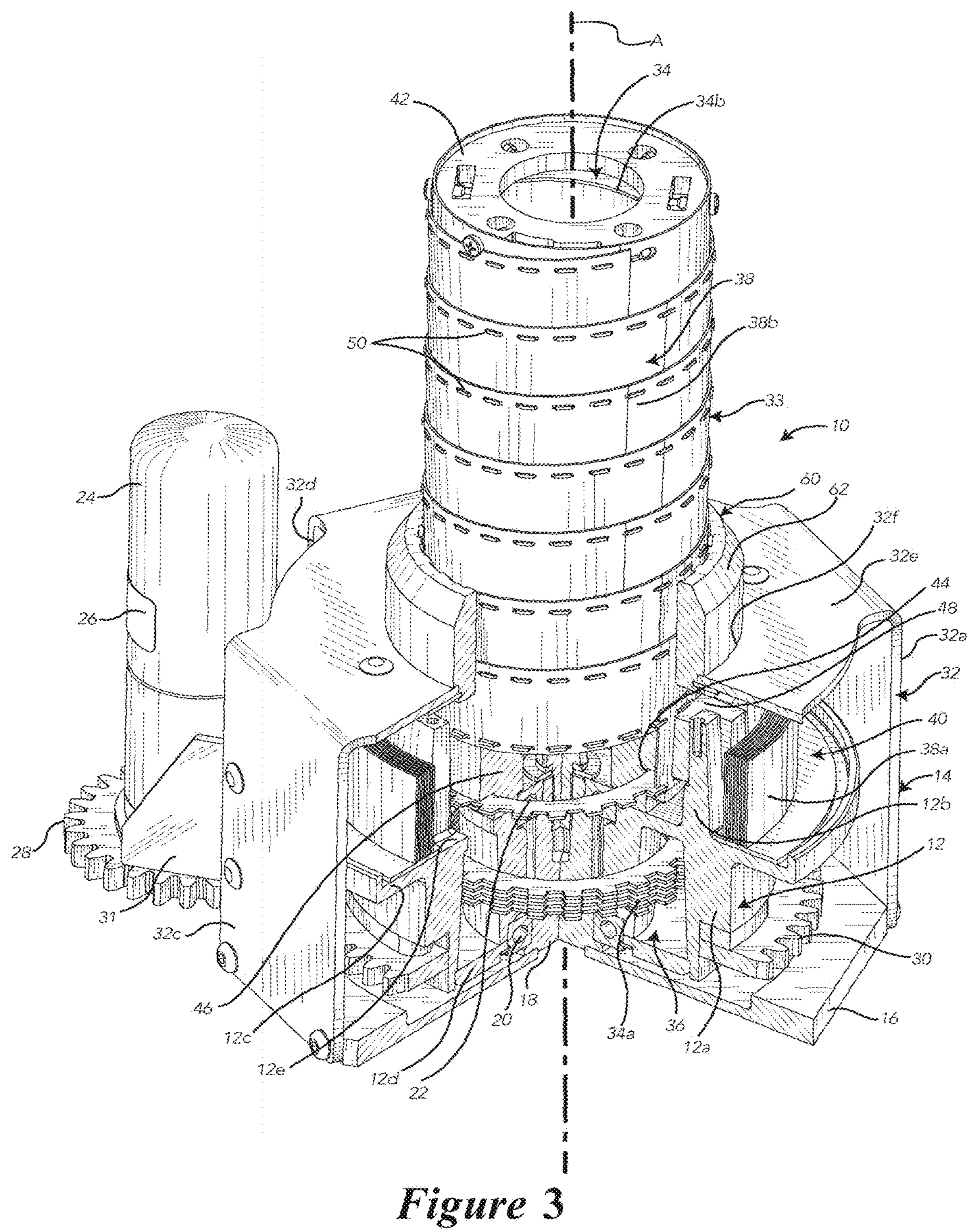

FIGS. 1-3 show a linear actuator 10 according to the present invention that is used to displace a load (not shown) along a longitudinal axis A. In most applications, axis A will be vertical and linear actuator 10 will be used to lift and lower a load vertically, but due to the interlocking nature of the bands that form linear actuator 10 as described hereinafter, axis A could be non-vertical. For simplicity, the following description might assume that axis A is vertical, but it is understood that this should not be considered limiting in any way.

Linear actuator 10 comprises a hollow rotor 12 rotatably carried over a base 14 that rests on, and is fixed to, the ground. Base 14 includes a flat base plate 16 and a central post 18 upstanding from base plate 16. High-capacity bearings 20, 22 allow rotor 12 to be rotatably carried by central post 18.

Figure 4:
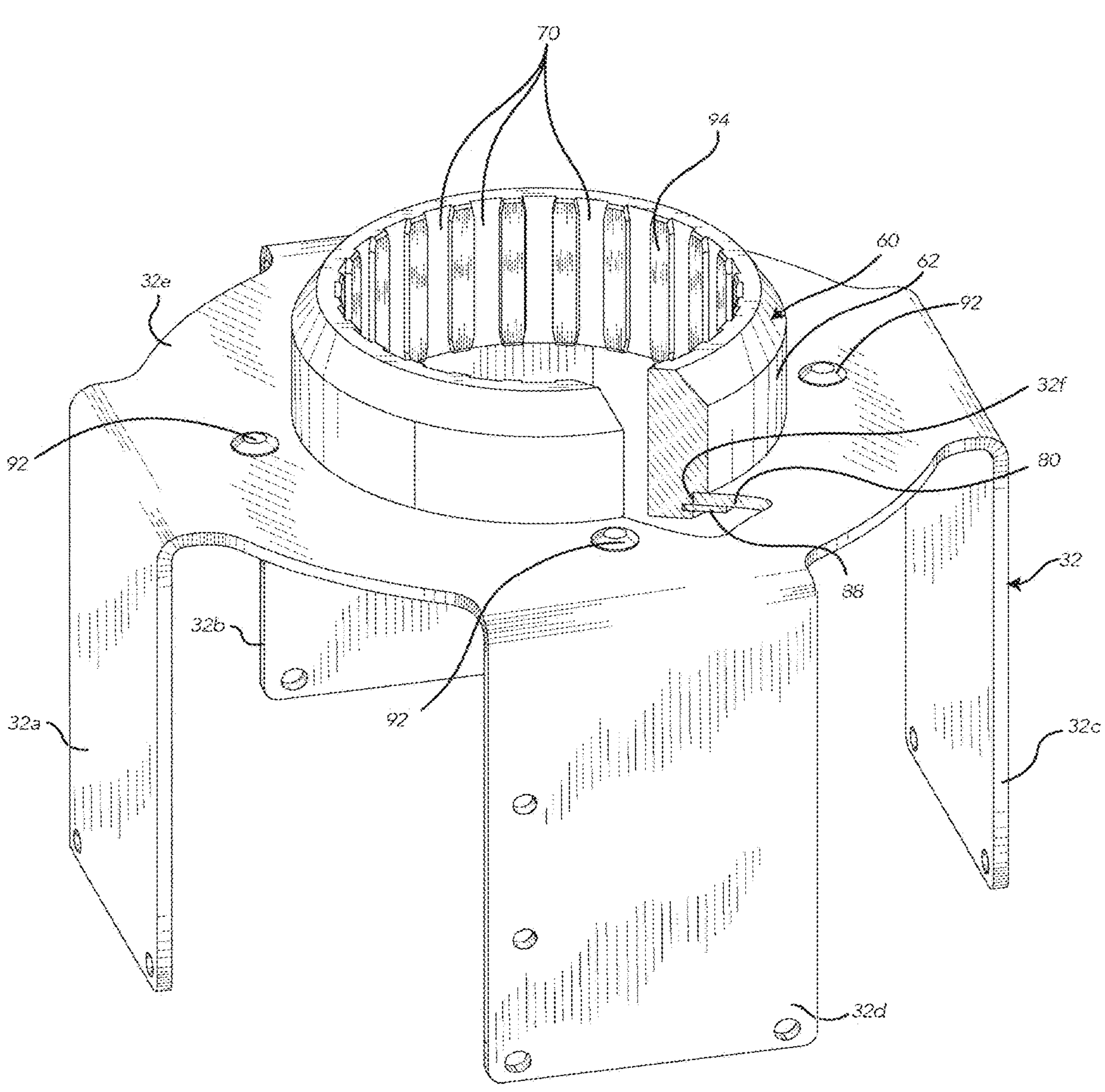
FIG. 4 is an enlarged top, partly broken perspective view showing the casing of the linear actuator FIG. 1, together with the anti-rotation ring and the attachment plates for attaching the anti-rotation ring to the casing.
Figure 5:
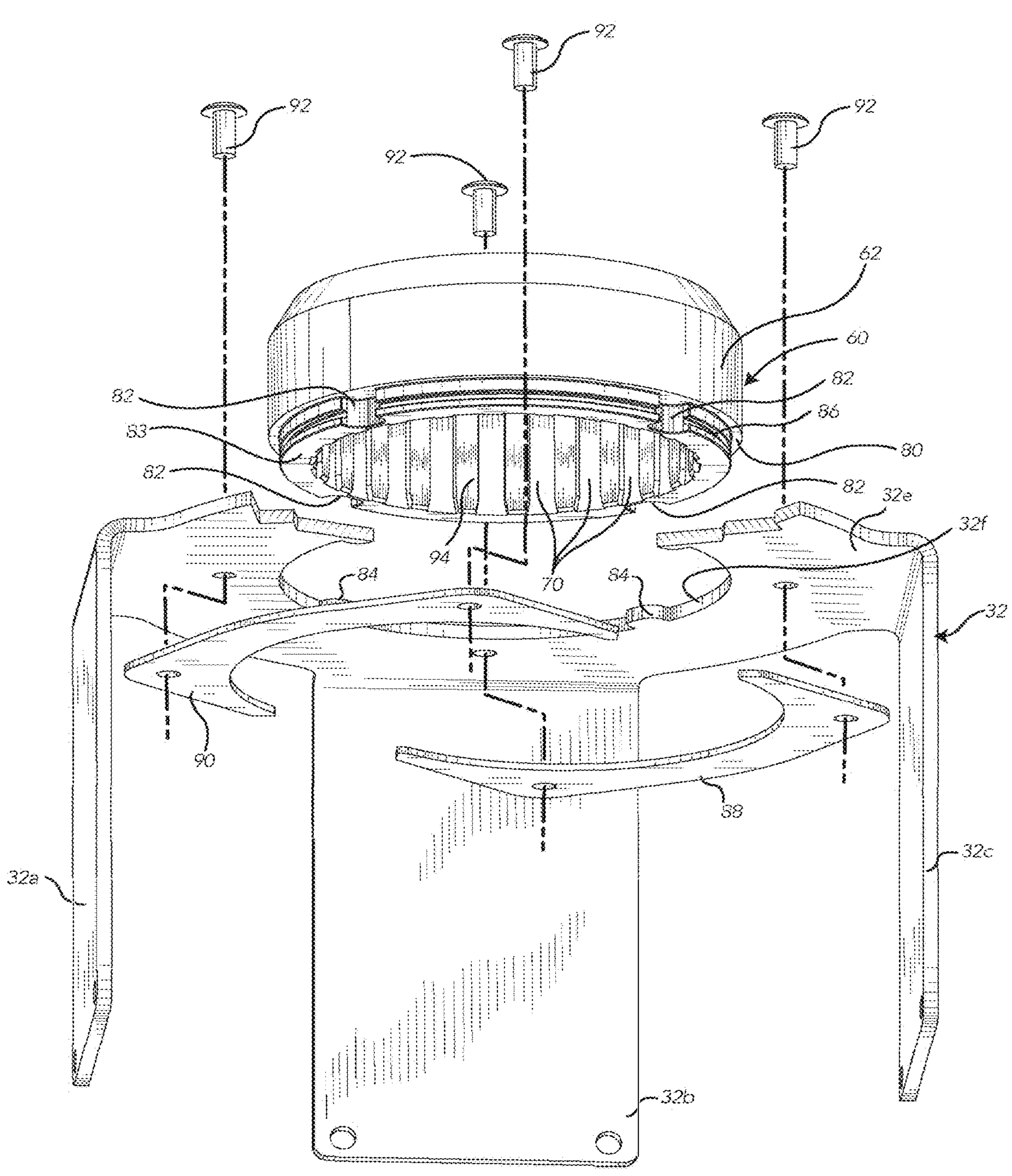
FIG. 5 is an exploded bottom perspective view of the elements of FIG. 4.

Base 14 comprises a casing 32 that is fixed to base plate 16 and that upstands therefrom. More particularly, and as further seen in FIGS. 4-5, casing 32 comprises four spaced-apart lateral walls **32*a*, 32*b*, 32*c*, 32*d* that carry a top wall 32*e* in which a circular central casing opening 32*f* is formed. Casing 32 extends spacedly over and above base plate 16 and partly encapsulates rotor 12. Casing 32 could have different configurations then that shown in the figures, e.g., it could have a full peripheral wall instead of spaced-apart lateral walls 32*a*, 32*b*, 32*c*, 32*d***, or include any other modification as would be obvious to a person skilled in the art.

Linear actuator 10 comprises a power actuator that comprises a motor 24, equipped with a control panel 26, that selectively rotates the rotor 12 by means of a pair of interconnected gear wheels 28, 30 that are respectively attached to motor 24 and to rotor 12. Base 14 comprises a motor support 31 carried by casing 32, with motor support 31 carrying motor 24.

Linear actuator 10 forms an extractable and retractable column 33 with a first band 34 that is used to interlock the successive turns of a second band 38 and to transfer the load from one turn of the second band 38 to the next.

More particularly, first band 34 has a stored portion **34*a* that is stacked in a helix and stored in a first band magazine 36 that is an annular space formed interiorly of a lower portion 12*a* of rotor 12. First band stored portion 34*a* can either rest on a bottom wall 12*d* of rotor 12 (and slide thereon while rotor 12 rotates), or be suspended above the bottom wall 12*d* of rotor 32 as shown in FIGS. 2-3. Second band 38 has a stored portion 38*a* that is horizontally stacked in a spiral and is stored in a second band magazine 40 that is an annular space formed radially exteriorly of an upper annular wall portion 12*b* of rotor 12, between rotor 12 and casing 32. Second band stored portion 38*a* rests on a horizontal support wall portion 12*c* of rotor 12 and slides thereon while rotor 12 rotates. An opening 12*e* is made in upper wall portion 12*b* of rotor 12 and the second band 38 extends through this opening 12*e* into a space that is radially inwards of upper wall portion 12*b***.

First band 34 and second band 38 have column portions **34*b* and 38*b* that are arranged to form extractable and retractable column 33 as detailed hereinafter. As column 33 gradually extracts or retracts, the length of each first and second band column portion 34*b*, 38*b* changes, in an inversely proportional way than the length of their stored portions 34*a*, 38*a*** changes.

The upper end of each band 34, 38 is fixedly attached to a load-engaging member 42 that engages the load to be displaced. If linear actuator 10 is disposed on the ground such that axis A is vertical (which is usually the case), the load to be displaced will be lifted or lowered by linear actuator 10, and consequently load-engaging member 42 will support the weight of this load. A platform or other intermediate structure (not shown) may be fixed to load-engaging member 42 between it and the load.

Figure 6:
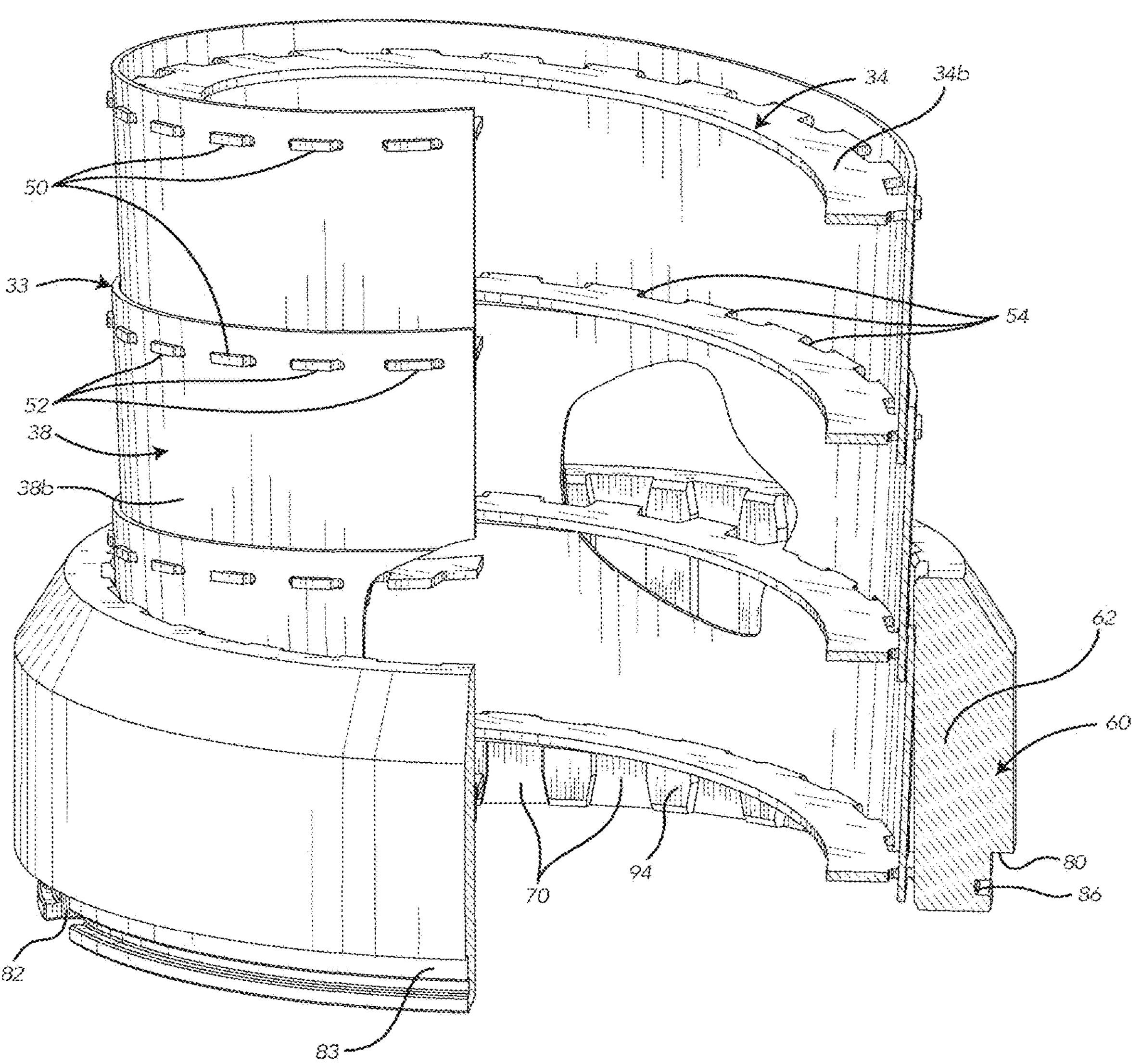
FIG. 6 is an enlarged, partly broken perspective view of the anti-rotation ring of the linear actuator of FIG. 1 together with a few turns of the first and second bands forming the extractable column.
Figure 7:
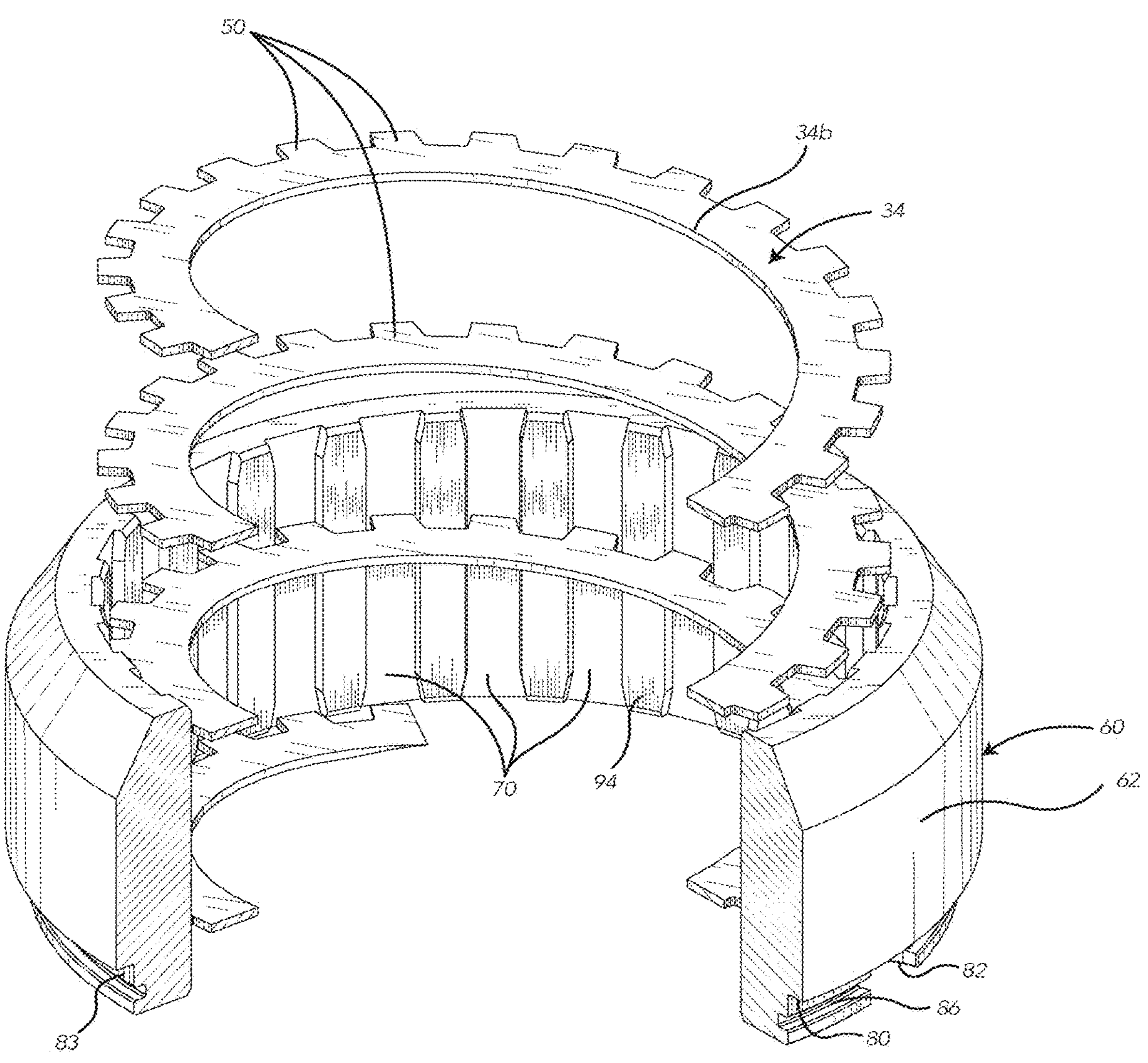
FIGS. 7 and 8 are an enlarged, partly broken perspective view of the anti-rotation device of the linear actuator of FIG. 1 together with a few turns of the first band forming the extractable column, sequentially suggesting the vertical movement of the first band relative to the anti-rotation device.
Figure 8:
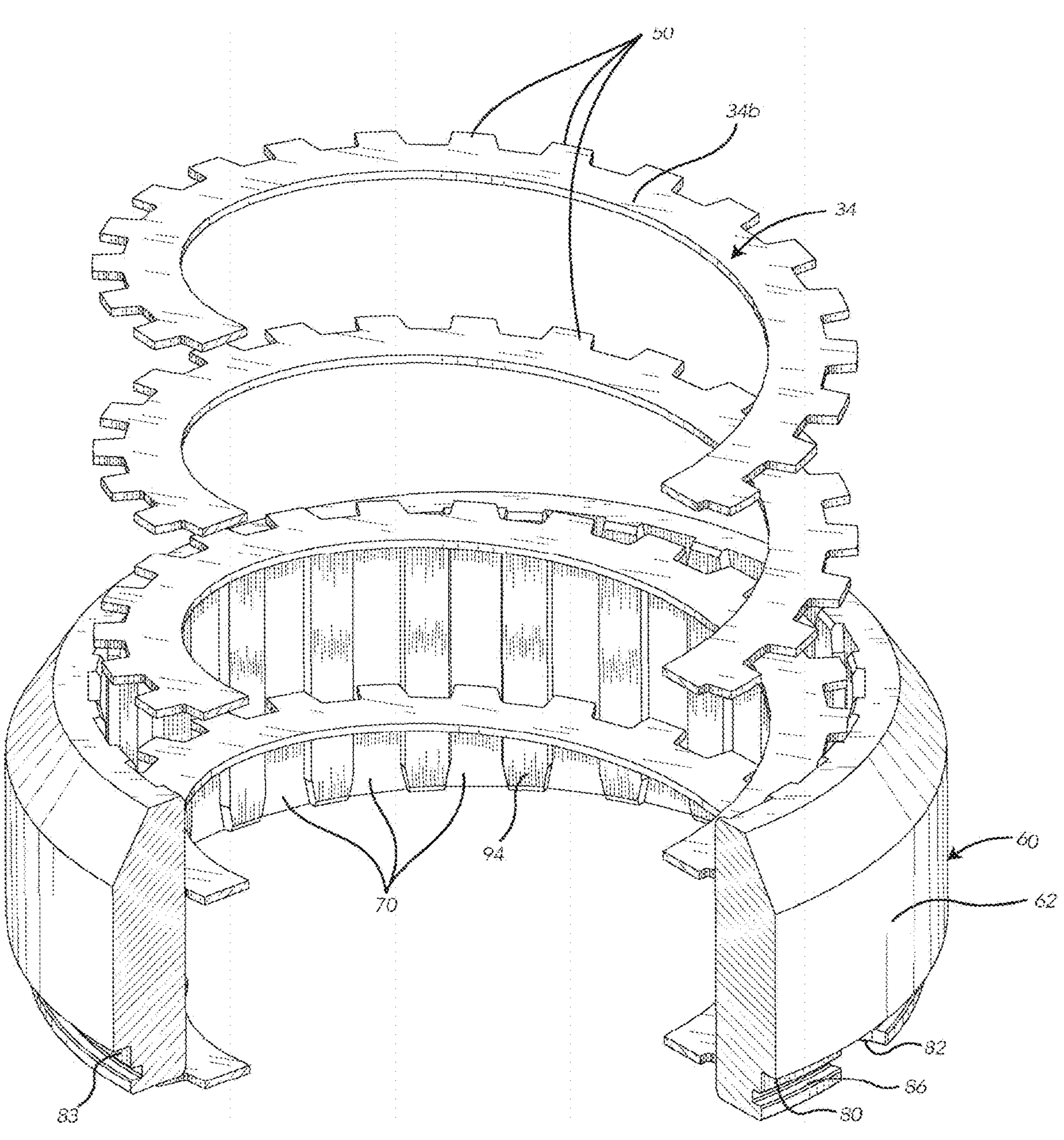

Rotor 12 comprises a first band guide member in the form of a helical groove 44 formed in an inner wall portion 46 of rotor 12. Rotor 12 also comprises a second band guide member in the form of a second band insertion pad 48 carried by rotor 12. When rotor 12 is rotated by motor 24 in a first direction to extract column 33, each turn of the second band 38 is guided by second band insertion pad 48 from second band magazine 40, through rotor opening **12*e* and into column 33, where it is disposed in helical configuration such that the upper fringe of each of its successive turns overlaps the lower fringe of the upwardly adjacent turn. Concurrently, each turn of the first band 34 is guided from first band magazine 36 through helical groove 44 and into column 33 where teeth 50 located on the outer periphery of the first band 34 engage openings 52, 54 that are respectively located on the overlapping upper and lower fringes of second band 38 to interlock each two successive turns of the column portion 38*b* of second band 38. The wall of the column 33 is consequently formed by the column portion 38*b* second band 38, while the teeth 50 of the first band 34 cooperate with the openings 52, 54 of the second band 38 as interlocking members to interlock the successive turns of the column portion 38*b* of the second band 38 and to transfer the load between each to successive turns of the second band 38—see FIG. 6**.

The load displaced by linear actuator 10 (e.g., supported if axis A is vertical) is more particularly transferred sequentially to load-engaging member 42, then through each successive first and second band turns of the first and second band column portions **34*b*, 38*b*, and then to rotor 12 on which the first band 34 rests in helical groove 44, and finally, through bearing 20, 22 to ground-resting base 14 and finally to the ground on which base plate 16** rests.

Motor 24 may rotate rotor 12 in a second direction, opposite the first direction, to retract column 33. The first and second band guide members (helical groove 44, insertion pad 48) will then guide the turns of the first and second bands 34, 38 gradually away from column 33 into first and second band magazine 36, 40, respectively.

The above description represents the standard operation of a linear actuator of known construction.

According to the present invention, and as shown in FIGS. 1-8, there is provided an anti-rotation mechanism for preventing column 33 from rotating without the load that is being displaced by column 33 having to be itself implicated in preventing this rotation, i.e., without load-engaging member 42 being fixed in rotation.

The anti-rotation mechanism of linear actuator 10 comprises a first anti-rotation member 60 attached to base 14, and more particularly, to casing 32; and a second anti-rotation member in the form of the protruding ends of first band teeth 50 that cooperate with the first anti-rotation member as described hereinafter.

First anti-rotation member 60 comprises a ring 62 that has an annular shoulder 80 at its lower end for fitting into the circular opening **32*f* of casing 32 and resting atop its top wall 32*e*. Indentations 82 are formed in the periphery of a lower wall portion 83 of ring 62 below shoulder 80, that are engaged by tabs 84 that protrude radially inwardly from casing top wall 32*e* within circular opening 32*f***.

An annular groove 86 is formed in lower wall portion 83 of ring 62 below shoulder 80. Groove 86 is located below casing top wall **32*e* when ring 62 rests on top wall 32*e* with shoulder 80. A pair of attachment plates 88, 90 engage groove 86 below casing top wall 32*e* such that casing top wall 32*e* is sandwiched between ring shoulder 80 and attachment plates 88, 90. Bolts 92 fix attachment plates 88, 90 to casing top wall 32*e***.

Ring 62 is diametrically sized to snugly receive therein column 33. The inner wall 94 of ring 62 has a number of straight grooves 70 that are parallel to axis A. Each groove 70 is of a depth and width so as to snugly receive therein in sliding longitudinal engagement one tooth 50, or a few teeth 50 that are aligned parallel to axis A, that protrude from the outer edge of first band 34 beyond the overlapping fringes of the second band 38.

In use, a number of teeth 50 will each slidingly engage a corresponding one of grooves 70 while column 33 extracts or retracts. More particularly, teeth 50 slide within grooves 70 in a direction that is parallel to axis A, as suggested in FIGS. 7 and 8, to force first band 34 to also move in a directly parallel to axis A. Indeed, while they thusly engage grooves 70, teeth 50 will tangentially abut against the side walls of grooves 70 of ring 62 to prevent rotation of column 33. Ring 62 is in turn prevented from rotation due to its attached to casing 32, and particularly, by means of the engagement of tabs 84 within indentations 82. Consequently, teeth 50, in addition to allowing interlocking engagement of the first and second bands 34, 38, further act as a second anti-rotation member that cooperates with the first anti-rotation member 60 to prevent rotation of column 33 about axis A.

In one embodiment (not shown), the first band could be positioned exteriorly of the second band, and the teeth could protrude inwardly. In such an embodiment, the anti-rotation device could be positioned interiorly of the second band, to receive the inwardly protruding teeth within grooves that would be located on its exterior surface.

In another embodiment (not shown), the column could be formed of a single band, resembling the second band of the first embodiment, but with one of its upper or lower fringes being equipped with teeth, while its other fringe would be equipped with corresponding openings. In this embodiment, the interlocking members that interlock the band turns in the column portion, would include e.g., the band teeth engaging the band's own openings. Yet again, whether the teeth extend inwardly or outwardly of the column, an anti-rotation device having grooves to be engaged by the teeth could be used to prevent the rotation of the column.

In another embodiment (not shown), anti-rotation pins are provided on either one of the bands, that are distinct from the interlocking teeth. These anti-rotation pins engage the anti-rotation device.

It is further possible to provide a linear actuator (not shown) with no interlocking teeth between the two bands: the two bands would then rest on one another as known from prior art devices. In such an embodiment, teeth or pins would be provided on one of the bands only for anti-rotation purposes, with no interlocking function.

In all embodiments, according to the present invention, the anti-rotation device and the teeth or pins cooperate to form an anti-rotation mechanism that is non-punctual. Indeed, contrarily to the prior art where a planar ring-shaped set of anti-rotation rollers is provided where the teeth engage between rollers at a single, punctual position around the ring of rollers, the present invention provides for a non-punctual engagement of a number of teeth into grooves of the anti-rotation device.

In the embodiment shown in the figures, the anti-rotation ring 62 is of a longitudinal length sufficient to allow at least an entire turn of first band 34 to engage grooves 70 with teeth 50, such that the anti-rotation tangential abutment of teeth 50 into grooves 70 is distributed all around the periphery of column 33 to reduce mechanical stresses on column 33. As shown in the figures, it is further possible to have even more than one turn of teeth 50 engaging ring 62.

Also, the longitudinal length of ring 62 helps column 33 resist radial forces, including flexing, due to the snug engagement of column 33 within ring 62.

What is claimed is:

1. A linear actuator comprising:

an elongated first band;

an elongated substantially flat second band;

said first and second bands having respective stored portions where they are separate from one another, and respective column portions where they engage one another to form an extractable and retractable column, with the second band column portion forming a helix about a longitudinal axis;

a rotatable first band guide member to guide turns of said first band between its said stored portion and its said column portion;

a rotatable second band guide member to guide turns of said second band between its said stored portion and its said column portion;

a power actuator to cause rotation of said first and second band guide members such that said extractable and retractable column may be extracted or retracted;

a base carrying said power actuator, said first and second bands and said first and second band guide members; and a radial support member attached to said base that extends along an entire periphery of said extractable and retractable column;

wherein said radial support member further extends longitudinally along said column about at least one full turn of said second band formed in a helix, for helping the extractable and retractable column resist radial forces due to the engagement of the extractable and retractable column against said radial support member.

2. The linear actuator as defined in claim 1, wherein said radial support member is located radially exteriorly of said extractable and retractable column.

3. The linear actuator as defined in claim 2, wherein said radial support member is a ring.

4. The linear actuator as defined in claim 3, further comprising an anti-rotation mechanism for preventing said extractable and retractable column from rotating relative to said base.

5. The linear actuator as defined in claim 4, wherein said anti-rotation mechanism includes complementary teeth and grooves that engage one another and that are provided respectively on one and the other of:

said extractable and retractable column, and either one of said base and said radial support member.

6. The linear actuator as defined in claim 3, wherein said grooves are formed in said radial support member and said teeth are provided on said extractable and retractable column.

7. A radial support member for use with a linear actuator of the type comprising:

an elongated substantially flat band having a column portion where turns of said band engage one another to form a helix about a longitudinal axis thereby forming an extractable and retractable column, said band further having a stored portion where its turns are separate from one another;

a rotatable band guide member to guide turns of said band from its said stored portion into its said column portion;

interlocking members to interlock the turns of the band in said column portion;

a power actuator to cause rotation of said band guide member such that said extractable and retractable column may be extracted or retracted;

a base carrying said power actuator, said band and said band guide member;

wherein said radial support member comprises a main body and an attachment member fixed to said main body for attachment to said base, said main body configured for extending along an entire periphery of said extractable and retractable column, wherein said radial support member main body is further configured for extending longitudinally along said column about at least one full turn of said second band formed in a helix, for helping the extractable and retractable column resist radial forces due to the engagement of the extractable and retractable column against said radial support member main body.

8. The linear actuator as defined in claim 7, wherein said radial support member is further configured to be located radially exteriorly of said extractable and retractable column.

9. The linear actuator as defined in claim 8, wherein said radial support member main body is a ring.

10. The linear actuator as defined in claim 9, wherein said radial support member main body comprises one of complementary teeth and grooves that engage the other of said complementary teeth and grooves that is provided on one of:

said extractable and retractable column, and either one of said base and said radial support member;

wherein said complementary teeth and grooves forms an anti-rotation mechanism for preventing said extractable and retractable column from rotating relative to said base.

11. The linear actuator as defined in claim 10, wherein said grooves are formed in said radial support member and said teeth are provided on said extractable and retractable column.

12. A linear actuator comprising:

an elongated substantially flat band;

said band having a column portion where turns of said band engage one another to form a helix about a longitudinal axis thereby forming an extractable and retractable column, said band further having a stored portion where its turns are separate from one another;

a rotatable band guide member to guide turns of said band from its said stored portion into its said column portion;

interlocking members to interlock the turns of the column portion of the band;

a power actuator to cause rotation of said band guide member such that said extractable and retractable column may be extracted or retracted;

a base carrying said power actuator, said band and said band guide member; and a radial support member attached to said base and extending along an entire periphery of said extractable and retractable column;

wherein said radial support member further extends longitudinally along said column about at least one full turn of said second band formed in a helix, for helping the extractable and retractable column resist radial forces due to the engagement of the extractable and retractable column against said radial support member.

13. The linear actuator as defined in claim 12, wherein said radial support member is located radially exteriorly of said extractable and retractable column.

14. The linear actuator as defined in claim 13, wherein said radial support member is a ring.

15. The linear actuator as defined in claim 14, further comprising an anti-rotation mechanism for preventing said extractable and retractable column from rotating relative to said base.

16. The linear actuator as defined in claim 15, wherein said anti-rotation mechanism includes complementary teeth and grooves that engage one another and that are provided respectively on one and the other of:

said extractable and retractable column, and either one of said base and said radial support member.

17. The linear actuator as defined in claim 16, wherein said grooves are formed in said radial support member and said teeth are provided on said extractable and retractable column.

* * * * *